United States Patent
Rappaport et al.

(10) Patent No.: US 12,141,291 B1
(45) Date of Patent: Nov. 12, 2024

(54) SECURED SYSTEMS DEVELOPMENT LIFECYCLE OF SOFTWARE APPLICATIONS

(71) Applicant: Wiz, Inc., Palo Alto, CA (US)

(72) Inventors: Assaf Rappaport, Tel Aviv (IL); Ami Luttwak, Binyamina (IL); Roy Reznik, Tel Aviv (IL); Yinon Costica, Tel Aviv (IL)

(73) Assignee: WIZ, INC., New York, NY (US)

( * ) Notice: Subject to any disclaimer, the term of this patent is extended or adjusted under 35 U.S.C. 154(b) by 102 days.

(21) Appl. No.: 17/338,173

(22) Filed: Jun. 3, 2021

Related U.S. Application Data

(60) Provisional application No. 63/034,032, filed on Jun. 3, 2020.

(51) Int. Cl.
*G06F 21/57* (2013.01)
*G06F 8/77* (2018.01)
*H04L 9/40* (2022.01)

(52) U.S. Cl.
CPC ............ *G06F 21/577* (2013.01); *G06F 8/77* (2013.01); *H04L 63/10* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 8,239,915 B1 * | 8/2012 | Satish | G06F 21/00 726/4 |
| 9,122,422 B2 | 9/2015 | Johnston et al. | |
| 9,489,647 B2 | 11/2016 | Martinez et al. | |
| 9,992,230 B1 * | 6/2018 | Haverty | H04L 41/12 |

(Continued)

OTHER PUBLICATIONS

C.-H. Lin, C.-H. Chen and C.-S. Laih, "A Study and Implementation of Vulnerability Assessment and Misconfiguration Detection," 2008 IEEE Asia-Pacific Services Computing Conference, Yilan, Taiwan, 2008, pp. 1252-1257, doi: 10.1109/APSCC.2008.212. (Year: 2008).*

(Continued)

*Primary Examiner* — Andrew M. Lyons
(74) *Attorney, Agent, or Firm* — M&B IP Analysts, LLC

(57) ABSTRACT

A system and method for securing the development of software applications are provided. The method includes receiving at least one trigger from a software development tool; determining an architecture score, wherein the architecture score measures the degree to which the architecture of the developed software application matches an approved architecture; determining a compliance score, wherein the compliance score measures the compliance of the developed security application to at least a set of one predefined security policy; determining a vulnerability score, wherein the vulnerability score measures the resiliency of the developed software application to at least reported security vulnerabilities; and determining a security score based on the architecture score, the compliance score, and the vulnerability score, wherein the security score is a measure indicating if the developed software application can be securely deployed without harming an environment of an organization executing the developed software application.

23 Claims, 7 Drawing Sheets

(56) References Cited

U.S. PATENT DOCUMENTS

| | | | | |
|---|---|---|---|---|
| 10,146,673 | B2 * | 12/2018 | Koren | G06F 11/3668 |
| 10,411,975 | B2 | 9/2019 | Martinez et al. | |
| 2005/0283834 | A1 * | 12/2005 | Hall | G06F 21/577 |
| | | | | 713/188 |
| 2011/0231817 | A1 * | 9/2011 | Hadar | G06Q 30/06 |
| | | | | 717/120 |
| 2011/0283253 | A1 * | 11/2011 | Dutta | G06F 8/10 |
| | | | | 717/121 |
| 2013/0219361 | A1 * | 8/2013 | Fiebig | G06F 8/70 |
| | | | | 717/121 |
| 2014/0237545 | A1 * | 8/2014 | Mylavarapu | H04L 63/1441 |
| | | | | 726/25 |
| 2015/0012703 | A1 * | 1/2015 | Ashok | G06F 9/45533 |
| | | | | 711/114 |
| 2017/0295197 | A1 * | 10/2017 | Parimi | H04L 63/10 |
| 2019/0079734 | A1 * | 3/2019 | Kadam | G06F 8/71 |
| 2020/0167476 | A1 * | 5/2020 | Boulton | G06F 21/563 |
| 2020/0379879 | A1 * | 12/2020 | Plotnik | G06N 20/00 |

OTHER PUBLICATIONS

J. Marques and A. M. da Cunha, "Tailoring Traditional Software Life Cycles to Ensure Compliance of RTCA DO-178C and DO-331 with Model-Driven Design," 2018 IEEE/AIAA 37th Digital Avionics Systems Conference (DASC), London, UK, 2018, pp. 1-8. (Year: 2018).*

V. Stirbu and T. Mikkonen, "CompliancePal: A Tool for Supporting Practical Agile and Regulatory-Compliant Development of Medical Software," 2020 IEEE International Conference on Software Architecture Companion (ICSA-C), Salvador, Brazil, 2020, pp. 151-158. (Year: 2020).*

* cited by examiner

SECURED SYSTEMS DEVELOPMENT LIFECYCLE OF SOFTWARE APPLICATIONS

CROSS-REFERENCE TO RELATED APPLICATIONS

This application claims the benefit of U.S. Provisional Application No. 63/034,032 filed on Jun. 3, 2020, the contents of which are hereby incorporated by reference.

TECHNICAL FIELD

The present disclosure relates to the field of software development methods and tools and, more particularly, to methods and systems for providing a secured systems development lifecycle (SDLC) for cloud applications.

BACKGROUND

The systems development lifecycle (SDLC) is a process used for planning, creating, testing, and deploying an information system. The systems development lifecycle concept applies to a range of hardware and software configurations, as a system can be composed of hardware only, software only, or a combination of both software and hardware. There are usually six stages in the cycle: requirement analysis, design, development and testing, implementation, documentation, and evaluation.

The SDLC process is performed using tools, known as development tools, such as continuous integration and continuous delivery (CI/CD) tools, and the like. Such tools are primarily designed to enable the development lifecycle through several phases or a pipeline. The pipeline is a deployable path which the software follows on the way to production. The pipeline may include CI/CD practices, which may be applicable to the software. An example CI/CD pipeline 100 is shown in FIG. 1.

In a source phase 110, the code written by the developers is committed through a version control software or systems, such as git, and the like. Such systems commit history of the software code so that it can be changed if needed. In a build phase 120, developers build and compile their code.

When software reaches the testing and staging phase 130, various tests are conducted on the software. One of the main tests is the unit test, in which the units of software are tested. After successful testing, the staging phase begins. Since the software has passed the previous tests in order to reach the staging phase, it is ready to be deployed into the staging process. In the staging phase 130, the software code is deployed to a staging environment or server. The code can be viewed and finalized in the staging environment or server before final testing.

In the deployment phase 140, the tested software is deployed to production. However, if any error occurs during the testing phase or the deployment phase, the software is sent by the development team to the version control procedure, and checked for errors. If errors are found, then they need to be fixed. Other stages may be repeated if required.

As companies and organizations transition to cloud computing platforms, many applications, including business and operation applications, are now executed in cloud computing platforms. In order to deploy and execute applications in cloud computing platforms, such applications need to comply with security, control, and manageability policies and governance.

However, current SDLC processes are not designed to comply with the policies and governance of applications and services designed to be executed in the cloud. Specifically, applications requiring rapid developments, modifications, and challenges may fail to comply. For example, application updates are typically pushed daily, typically as updates. Usually any such application update, for example, requires going through the SDLC process. Further, applications and services have multiple dependencies and, thus, compliance of one application does not ensure compliance of another, dependent, application or service. Current SDLC processes are not designed to discover all such dependencies, and, therefore, are not configured to ensure compliance across dependent applications.

As such, cloud applications and services developed using the conventional SDLC processes and tools typically do not meet the required security, control, and manageability policies and governance. Specifically, applications developed using such tools may be vulnerable to malicious cyber activity or non-compliance.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for securing development of software applications. The method comprises receiving at least one trigger from a software development tool, wherein the at least one trigger requests a security evaluation for a software application developed using the software development tool; determining an architecture score, wherein the architecture score measures the degree to which the architecture of the developed software application matches an approved architecture; determining a compliance score, wherein the compliance score measures the compliance of the developed security application to at least a set of one predefined security policy; determining a vulnerability score, wherein the vulnerability score measures the resiliency of the developed software application to at least reported security vulnerabilities; and determining a security score based on the architecture score, the compliance score, and the vulnerability score, wherein the security score is a measure indicating if the developed software application can be securely deployed without harming an environment of an organization executing the developed software application.

Certain embodiments disclosed herein also include a non-transitory computer readable medium having stored thereon instructions for causing a processing circuitry to execute a process, the process comprising receiving at least one trigger from a software development tool, wherein the at least one trigger requests a security evaluation for a software application developed using the software development tool; determining an architecture score, wherein the architecture score measures the degree to which the architecture of the developed software application matches an approved architecture; determining a compliance score, wherein the compliance score measures the compliance of the developed security application to at least a set of one predefined security policy; determining a vulnerability score, wherein the vulnerability score measures the resiliency of the developed software application to at least reported security vulnerabilities; and determining a security score based on the architecture score, the compliance score, and the vulnerability score, wherein the security score is a measure indicating if the developed software application can be securely deployed without harming an environment of an organization executing the developed software application.

Certain embodiments disclosed herein include a system for securing development of software application. The system comprises a processing circuitry; and a memory, the memory containing instructions that, when executed by the processing circuitry, configure the system to: receive at least one trigger from a software development tool, wherein the at least one trigger requests a security evaluation for a software application developed using the software development tool; determine an architecture score, wherein the architecture score measures the degree to which the architecture of the developed software application matches an approved architecture; determine a compliance score, wherein the compliance score measures the compliance of the developed security application to at least a set of one predefined security policy; determine a vulnerability score, wherein the vulnerability score measures the resiliency of the developed software application to at least reported security vulnerabilities; and determine a security score based on the architecture score, the compliance score, and the vulnerability score, wherein the security score is a measure indicating if the developed software application can be securely deployed without harming an environment of an organization executing the developed software application.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
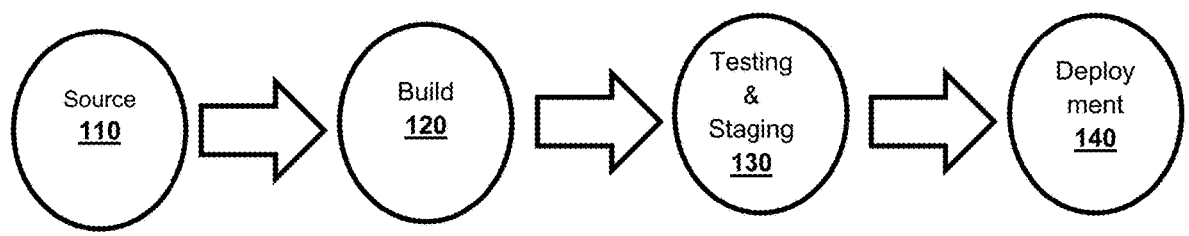
FIG. 1 is a diagram illustrating the CI/CD pipeline (prior art).

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
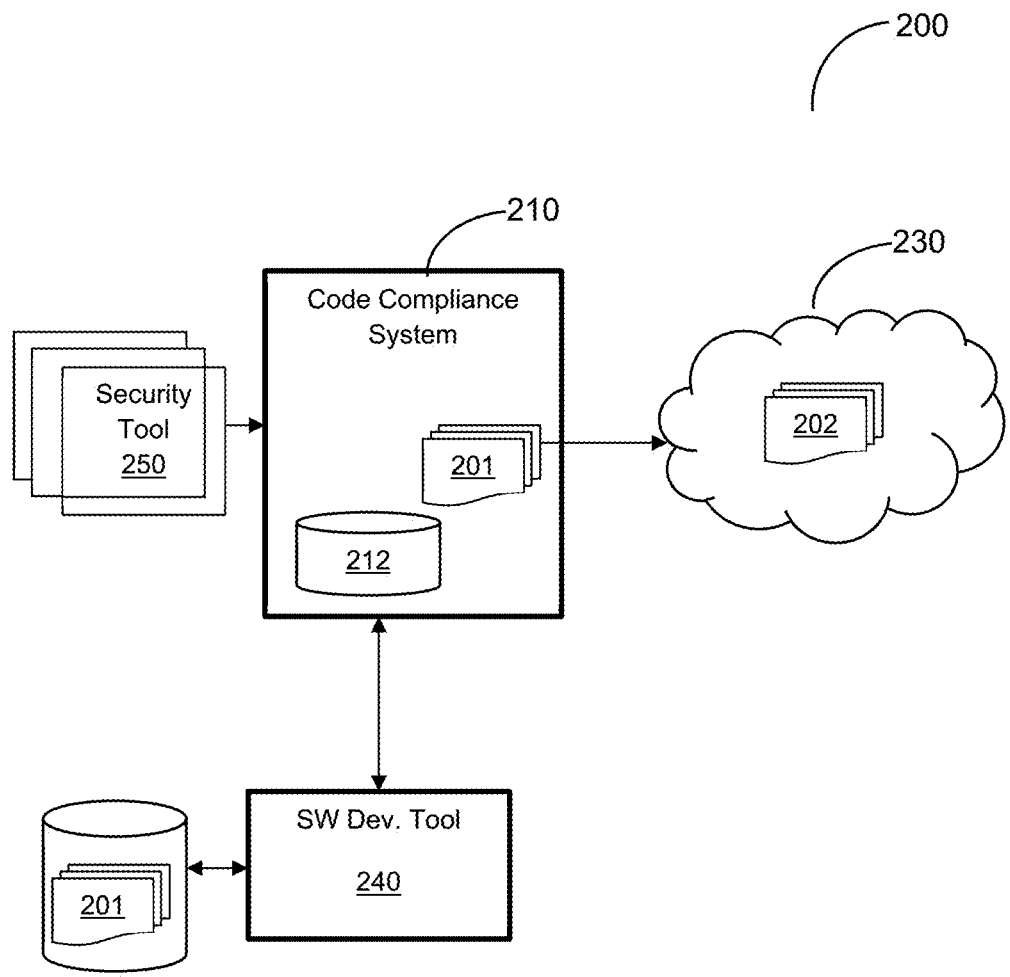
FIG. 2 is a system diagram utilized to describe the various disclosed embodiments.

FIG. 2 is an example diagram 200 utilized to describe the various embodiments for securing software development for cloud applications. In the example diagram 200, a code compliance system (hereinafter, the system 210) is configured to provide a secure development lifecycle for cloud applications 202, according to the disclosed embodiments. The deployment of the cloud applications 202 is in a cloud computing platform 230. The cloud computing platform 230 may be a private cloud, a public cloud, a hybrid cloud, and the like. Examples of cloud computing platforms 230 include Amazon® Web Services (AWS), Cisco® Metacloud, Microsoft® Azure®, Google® Cloud Platform, HP® Cloud, and the like.

The system 210 is connected to the cloud computing platform 230 over a network (not shown) through an application programming interface (API). The network may be a local area network, a wide area network, the Internet, and the like.

The system 210 is connected to a software development tool 240. The software development tool 240 provides the CI/CD of the development process as discussed in detail above. Example for the software development tool 240 may be Jenkins®, Travis CI, GitLab, and the like. The connection may be achieved over a network (not shown), through an API. The system 210 may receive triggers when a new software project is created, and changes, known as "drifts," from an already deployed software project, either in the continuous integration or continuous delivery stage. The system 210, by interfacing with the software development tool 240, may generate a product tree for the software project. The product tree may include all the contents of the projects, development platforms, and cloud infrastructure of the organization and the respective projects' owners.

The system 210 can also interface with, or otherwise access, a code repository 245 of the software development tool 240. In an embodiment, the binary files of developed software applications in the code repository 245 can be accessed and analyzed by the system 210.

The system 210 is also connected to a plurality of security testing tools 250. The connection may be a connection achieved over a network (not shown), through an API. The security testing tools 250 may include a container scanner tool, a vulnerability scanner tool, a software composition analysis (SCA) tool, and the like.

According to the disclosed embodiments, the system 210 is configured to generate a security score for each software application developed and deployed, by an organization, in the cloud computing platform 230. It should be noted that a project may include different software applications later deployed as cloud applications 202. The system 210 is configured to secure each software application (hereinafter, developed application 201) which may be part of a software project developed by the organization. For example, a developed application 201 may include any of HR applications, finance applications, inventory management applications, and internal portals for all parts of the organization's software projects.

The system 210 is configured to check the developed application 201 for security and compliance prior to deployment as a cloud application 202 in the cloud computing platform 230. The system 210 is further configured to continuously check drifts to the architecture of the developed application.

According to the disclosed embodiments, the system 210 is configured to determine a risk profile based on the software architecture and to further determine an approved security architecture for the developed application 201. The software architecture may define services, settings, attributes, resources, components, and the like, which the developed application 201 executes, accesses, or is otherwise configured with. For example, the architecture defines whether the developed application 201 is programmed with permissions to access an external database.

The system 210 is further configured to detect any changes from the approved security architecture when drifts are reported, thus providing continuous validation of the approved architecture for the application. In an embodiment, the system 210 is configured to determine, by questioning software development teams in the organizations, on services, settings, components, and the like of the system 210. In another embodiment, the approved architecture may be generated by analyzing architectural patterns of software applications previously developed by the organization.

In an embodiment, the system 210 if further configured to analyze the developed application 201 using continuous risk and compliance assessments. This includes validating that the developed application 201 complies with required security policy standards and compliance controls. The system 210 is further configured to test the resiliency of the developed application 201 to various cyber threats, vulnerabilities, and incidents. These processes will be described below. The continuous risk and compliance assessment is performed in response to the developed application 201.

Based on the security testing, assessed compliance controls, and the validated architecture, a security score is computed for the developed application 201. The security score provides an indication as to the security measures applicable to the developed application 201. The security score may be a numerical value (1-100), a level-based score (high, medium, low), and the like. A security score is generated for each developed application 201 in an organization's software project, providing visibility across the entire software development pipeline of the organization.

In an embodiment, a gating mechanism is enabled based on the security score. The gating mechanism can prevent execution of a phase in the CI/CD pipeline. That is, for example, when the security score of the developed application 201 is above a predefined threshold, the gating mechanism may preempt the deployment of the developed application 201 to the cloud computing platform 230.

In addition, a list of security tasks to be coded in order to reduce the vulnerability of the developed application 201 may be generated based on the security score. Such tasks may be prioritized based on the score's value. For example, a security task would include disabling access to an external resource when the score is low, with the assumption that the application is at risk. The security tasks may be directed to the software developers to improve the code.

In a further embodiment, the security score can be fed into security information and event management (SIEM) systems or other SecOps incident management systems. This would allow for enrichment of events with the security scores and further triage alerts based on product business risks and scores.

Figure 3:
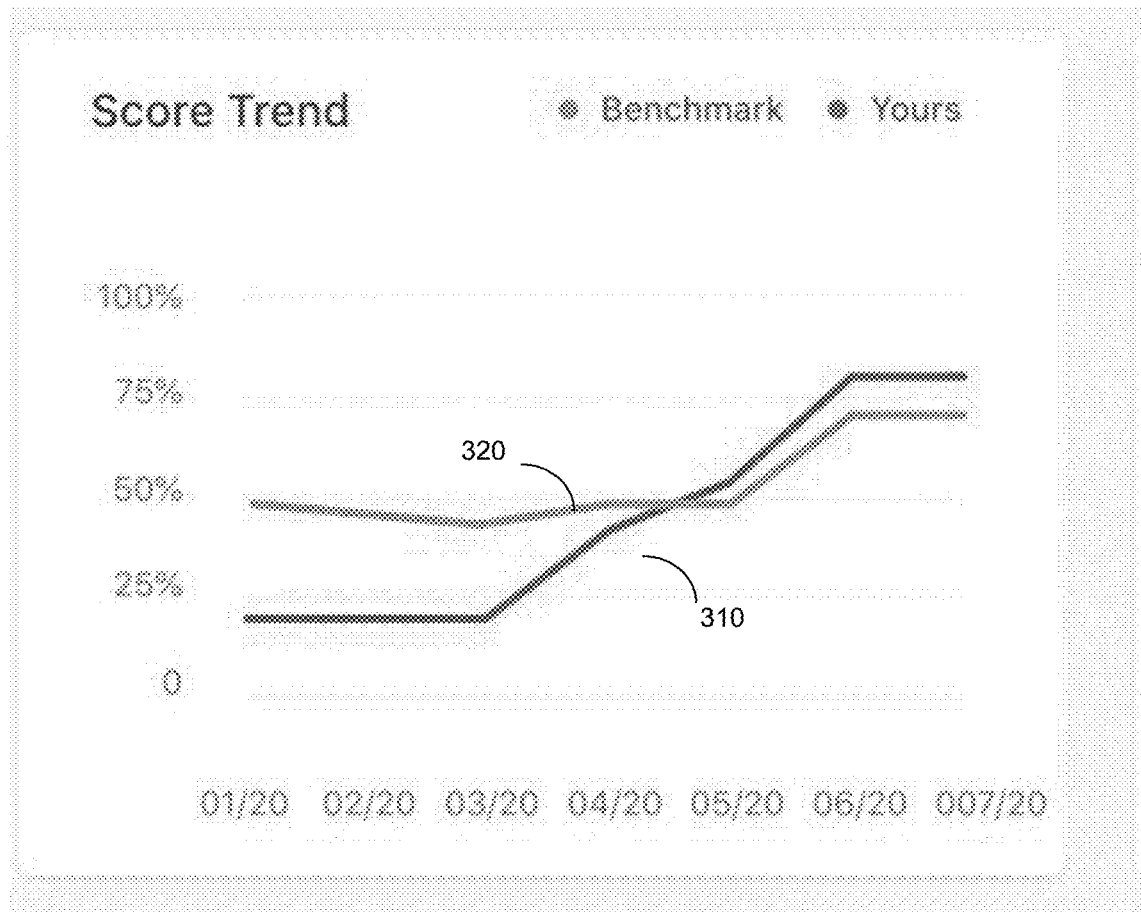
FIG. 3 is a screenshot illustrating a comparison of a security score to a benchmark.

The system 210 is further configured to maintain and display previous security scores computed for the protected developed application 201. For example, security scores before and after an architecture drift can be displayed. The security score computed over a number of drifts can be maintained and displayed. In another embodiment, the security score can be displayed in comparison to a benchmark defined by the organization. This is demonstrated in FIG. 3, where the security scores are presented as elements 310 in a graph, and where the benchmark score is represented as another element 320 of the graph.

In other embodiments, a list of detailed findings affecting the security scores is generated and may be displayed. Such findings may include identified vulnerabilities, risky connections to the software development tool 240, non-compliant policies, and risk architecture drifts.

Figure 7:
FIG. 7 is a screenshot showing gathered stack information to a specific resource.

According to an embodiment, the system 210 includes a stack database 212 which maintains stack information on all global resources and environments utilized by software products. For example, the resources may include information on databases (e.g., MongoDB®, MySQL®, and the like), SDKs, services, and the like. The information is gathered and populated automatically by the system 210 based on the analysis of the code. As an example, FIG. 7 shows the information gathered for a "Scalaris" database. Some of the information is a general description of the resources, while others are specific to the identity and access permission given to the analyzed developed application 201.

Note that the stack database 212 may include stack information as gathered from a plurality of software products analyzed by the system 210. The software products may be of the same organization, or across different organizations. In one embodiment, the stack database 212 is a distributed database or hosted in a cloud storage service.

It should be noted that only one software development tool 240 and one developed cloud application 202 are shown in FIG. 2, merely for the sake of simplicity. However, the embodiments disclosed herein are applicable to a plurality of software development tools 240 that can connect to the system 210. Further, the system 210 may connect to a plurality of different cloud computing platforms. In addition, the system 210 can secure, using the disclosed embodiments, the development of multiple software applications in the same project or different projects. In an embodiment, the system 210 may be configured as an on-premise deployment, or alternatively deployed in the cloud computing platform 230. The embodiments described may be implemented without any loss of generality or departure from the scope of the disclosed It should be appreciated that the developed application 201 may include a software application, a service, a program, a function, a library, or any piece of software code. Software shall be construed broadly to mean any type of instructions, whether referred to as software, firmware, middleware, microcode, hardware description language, or otherwise. Instructions may include code, such as in source code format, binary code format, executable code format, or any other suitable format of code. The code may be either compiled code, requiring a compiler, or any script code that does not require compilation.

It should be further appreciated that no agent is required to connect or gather data from the software development tools 240, the security testing tools 250, and the cloud computing platform 230.

Figure 4:
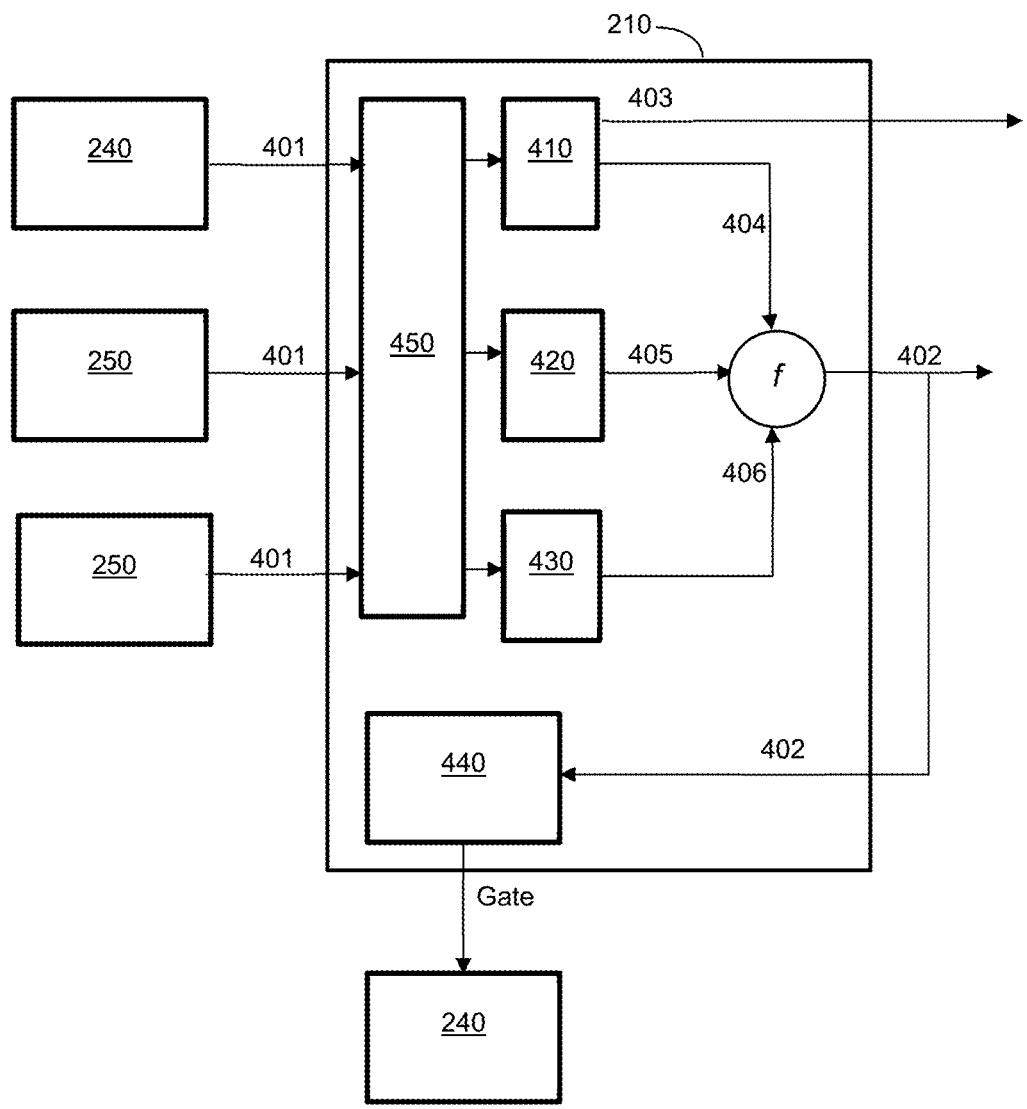
FIG. 4 is a schematic diagram illustrating the operation of a code compliance system according to an embodiment.

FIG. 4 shows an example diagram 400 describing the operation of the system 210 for securing software development of software applications according to the disclosed embodiments.

The system 210 may receive triggers 401 from at least one software development tool 240 and output a security score

402 for each developed application in the project. The system 210 can further output a product tree 403.

The triggers 401 may be indicative of new developed applications (products), changes (drifts) to the application, and pre-deployment of the developed application, as well as a CI trigger for continuous assessments.

The security score 402 generated by the system 210 is based on, in part, an architecture score 404, a compliance score 405, and a vulnerability score 406. In an embodiment, the security score 402 for each developed application is a weighted average of the scores 404-406, where the weights may be predefined based on the type of the project and the developed application. It should be noted that other functions can be utilized to determine the security score 402.

In an embodiment, an architecture score 404 is determined by the architecture engine 410 when a trigger 401 indicating a new developed application 201, or a detected drift, is asserted. The software architecture may define services, settings, attributes, resources, components, and the like including, as examples and without limitation, the programming language, the physical cloud platform, access to networks, web sources, databases, the types of databases, and the like.

The architecture score 404 defines the degree to which the architecture of a developed application 201 matches an approved architecture. An approved architecture is a predetermined set of architectural patterns and security requirements. In an example embodiment, the approved architecture may be determined based on a questionnaire provided to the development team. In yet another embodiment, the approved architecture is automatically generated based on a set of software design patterns previously adopted or used by the organization.

Any new application or detected drift is compared to the approved architecture. To this end, the architecture engine 410 is configured to collect data for developed applications, as well as data on drifts, when available. The data can be collected over time from the cloud computing platform 230, of FIG. 3, or the software development tool 240, and an associated code repository. The data may also include the stack information in the stack database 450. Using the data as an architecture model, the developed application is generated. The generation of the architecture model includes a full stack analysis, including classification, i.e., mapping resources and developed application(s) in a product, an identity analysis, a network analysis, and an image analysis. The network analysis identifies the network(s) that each resource in the developed application can access. The image analysis is an analysis of a snapshot of any virtual machine (VM) or resource accessed or utilized by the developed application. The image analysis provides indication about at least the role and vulnerabilities of each such VM or resource. The vulnerabilities can be later utilized for threat modelling.

The generated architectural model is compared to the approved architecture, in order to determine the architectural changes and the associated risk with respect to the security requirements. The score may be a function of the number of determined architectural changes, and the assertion of each such change. For example, if a detected architectural change is in the platform as a service (PaaS) infrastructure, such as in an AWS® or Azure® deployment, the associated risk may be low as both platforms are equally secured. As another example, if the detected architectural change is a new access given to a database containing sensitive information, the risk of the change is high. The architecture score 404 may be a numerical value, e.g., between 0-100.

In an embodiment, a compliance score 405 is determined by a compliance engine 420. To this end, the compliance engine 420 determines the compliance of each developed application 201 with the security policies and standards predefined for the project, by the organization. The compliance engine 420 determines the compliance score 405 based on configuration compliance and security protection. In one embodiment, the configuration compliance is a measure of the product's conformance to baseline configuration standards to identify non-compliance, and for observing configuration drift over time. The configuration standards are retrieved from external sources, such as those provided by Qualys®, RedLock®, Tanium®, and the like.

The security protection measure is to determine if the product possess the required compliance security controls. Examples of such controls include, for example, a web application firewall (WAF), a malware scanner, and the like. The controls are typically defined by a security team within the organization. The compliance score 405 may be a numerical value, e.g., between 0-100.

The vulnerability score 406 is determined by a security engine 430. To this end, the compliance engine 420 determines whether the resiliency of each developed application to the security vulnerabilities and incidents reported by the plurality of security testing tools 250. The resiliency may be determined based on the design of the application and how the developers respond, by modifying, reprogramming, or reconfiguring the application, to such vulnerabilities and/or incidents. In an embodiment, the vulnerabilities identified by the various security testing tools 250 along the development pipeline, and the incidents, pertain cloud platform's environments. The vulnerability score 406 may be a numerical value, e.g., between 0-100.

In an embodiment, the system 210 further includes a gating engine 440. The gating engine 440 interfaces with the software development tool 240 and implements gating at different stages in the software development pipeline. The gating engine 440 determines gating based on the determined security score 402.

It should be emphasized that the various engines 410, 420, 430, and 440 continuously operate during development, integration, and delivery. That is, even after the developed applications have been deployed, the system 210 continuously checks and validates the developed application.

It should be noted that the various engines 410, 420, 430, and 440 provide the functional blocks of the system 210. The engines 410, 420, 430, and 440 may be implemented as hardware, firmware, software, or any combination thereof. The hardware may be any logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, graphics processing units (GPUs), tensor processing units (TPUs), general-purpose microprocessors, microcontrollers, digital signal processors (DSPs), and the like, or any other hardware logic components that can perform calculations or other manipulations of information.

Figure 5:
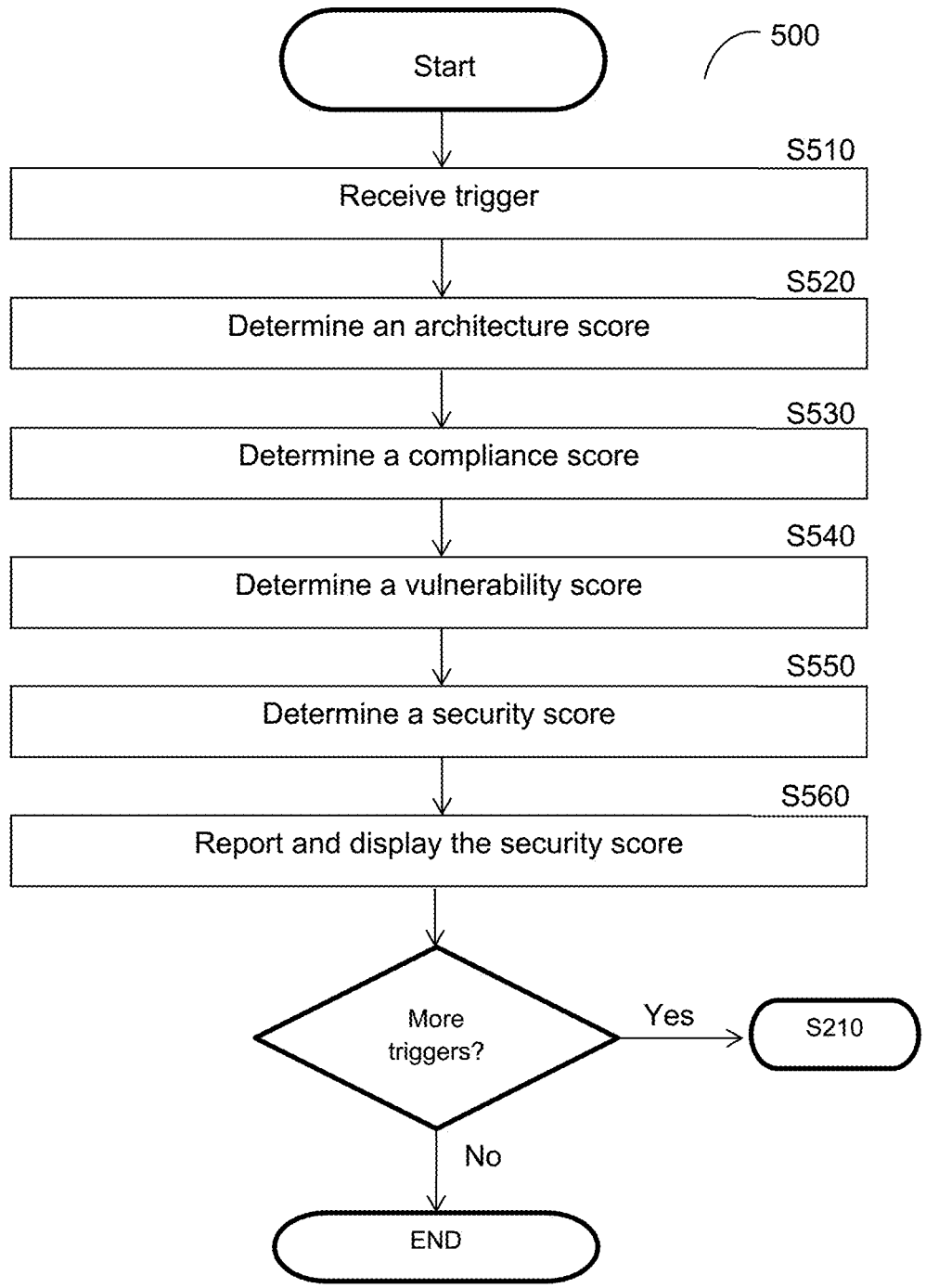
FIG. 5 is a flowchart method for determining a security score based on code of a developed software application, according to an embodiment.

FIG. 5 is an example flowchart 500 of a method for determining a security score based on code of a developed software application, according to an embodiment. The developed software is part of a software project developed by an organization. The application or applications are cloud applications that are part of the software project, once ready, are deployed in a cloud platform as could application(s). The computing of the security score 402 is performed during a software development lifecycle or pipeline, such as CI/CD pipeline.

At S510, at least one trigger is received from a software development tool. The trigger may indicate newly-developed applications (products), changes (drifts) to the application, or pre-deployment of the developed application, as well as a CI trigger for continuous assessments. In an embodiment, the trigger requests a security evaluation for a software application developed using the software development tool.

At S520, an architecture score, measuring the degree to which the architecture of a developed application matches an approved architecture, is determined. In an embodiment, the architecture score is determined when a trigger indicating a newly-developed application or a detected drift is received. S520 may include matching the architecture of the developed application to an approved architecture to detect architectural changes, as well as a security risk associated with each detected change. As noted above, the architecture score is determined based on the changes.

At S530, a compliance score, measuring the compliance of a developed application to predefined security policies and standards, is determined. To this end, the code and configuration of the developed application are compared to a set of configuration standards and compliance security controls. Such standards and controls are received form third-party external tools, examples of which are provided above. The compliance score is a function of the number of detected deviations and their respective security severity.

At S540, a vulnerability score, measuring the resiliency of the developed application to security vulnerabilities and incidents, is determined. The vulnerabilities and incidents are reported by security tools during the development pipeline. The vulnerability score may be a function of the number of the reported vulnerabilities or incidents addressed by the developers of the developed application, or a combination of the number of reported vulnerabilities and incidents. The vulnerability score may be function of the number of relevant reported vulnerabilities and incidents and/or their severity. The vulnerabilities and incidents are relevant to the developed software application and/or the environment.

At S550, a security score is determined as a function of the architecture score, the compliance score, and the vulnerability score. The security score is a measure indicating if the developed software application can be securely deployed without harming an environment of an organization executing the developed software application. In an embodiment, the function is a weight average where the weights are assigned to the various scores based on, for example, the type of the developed application and its sensitivity.

At S560, the security score is reported and displayed. The score can be displayed with respect to its trend over time and in comparison, to a benchmark defined by the organization. In another embodiment, the security score may be reported to SEIM systems and the like to enrich event reports by such systems. As noted above, the security score may also be utilized to activate gating throughout the various stages of the development pipeline.

At S570, it is checked if a new trigger has issued, and, if so, execution returns to S510; otherwise, execution ends. It should be noted that the method of generating the security score allows for automating security checks in commit, build, and deployment stages of development. Further, the security score is continuously updated when new vulnerabilities and incidents are reported. In some embodiments, if the determined security score is above the benchmark a mitigation action may be taken. The mitigation action blocks deployment of the developed software application in the environment.

It should be noted that steps S520, S530, and S540, discussed above, can be performed in different orders or in parallel.

Figure 6:
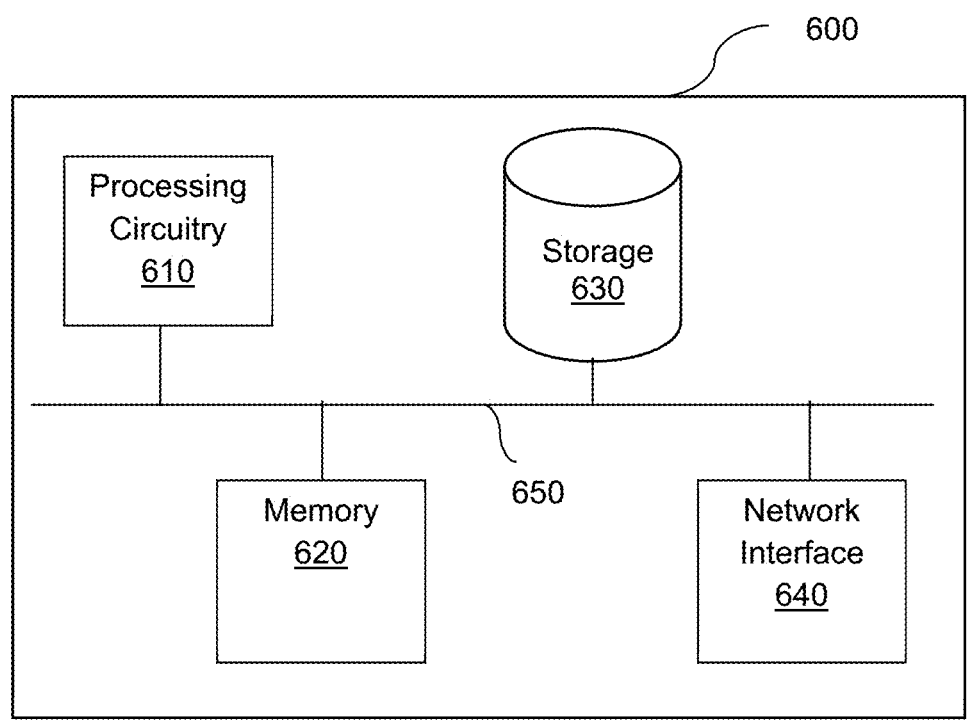
FIG. 6 is a schematic diagram of a code compliance system, according to an embodiment.

FIG. 6 shows an example block diagram of the system 210 implemented according to an embodiment. The system 210 includes a processing circuitry 610 coupled to a memory 615, a storage 620, and a network interface 630. In an embodiment, the components of the architecture engine 410 may be communicatively connected via a bus 640, e.g., PCIe, or another high-speed data bus.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, graphics processing units (GPUs), tensor processing units (TPUs), general-purpose microprocessors, microcontrollers, and digital signal processors (DSPs), and the like, or any other hardware logic components that can perform calculations or other manipulations of information.

The memory 615 may be volatile (e.g., RAM, etc.), non-volatile (e.g., ROM, flash memory, etc.), or a combination thereof. In one configuration, computer readable instructions to implement one or more embodiments disclosed herein may be stored in the storage 620.

In another embodiment, the memory 615 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various processes described herein.

The storage 620 may be magnetic storage, optical storage, and the like, and may be realized, for example, as flash memory or other memory technology, CD-ROM, Digital Versatile Disks (DVDs), or any other medium which can be used to store the desired information.

The network interface 630 allows the system 610 to communicate with the at least one various data sources or databases. It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing development of software applications to be deployed in a cloud computing platform, comprising:
   receiving at least one trigger from a software development tool, wherein the at least one trigger requests a security evaluation for a software application developed using the software development tool;
   determining an architecture score, wherein the architecture score measures a degree to which the architecture of the developed software application, as represented by an architectural model generated for the software application to be executed by the cloud computing platform, matches an approved architecture for the software application;
   determining a compliance score, wherein the compliance score measures the compliance of the developed software application to at least one predefined security policy;
   determining a vulnerability score, wherein the vulnerability score measures a resiliency of the developed software application to at least one reported security vulnerability; and
   determining a security score based on the architecture score, the compliance score, and the vulnerability score, wherein the security score is a likelihood that the developed software application can be deployed in the cloud computing platform without harming an environment of an organization executing the developed software application.

2. The method of claim 1, further comprising:
   comparing the determined security score to a predefined benchmark; and
   taking a mitigation action to block deployment of the developed software application in the environment when the result of the comparison is that the determined security score exceeds the predefined benchmark by a prescribed threshold.

3. The method of claim 2, wherein the mitigation action further includes: reporting the determined security score to a security information and event management (SIEM) system.

4. The method of claim 1, further comprising:
   monitoring a trend over time of the security score.

5. The method of claim 1, wherein the at least one trigger is sent upon an existence of at least one of: a newly developed software application and changes in the developed software application.

6. The method of claim 1, wherein determining the architecture score further comprises:
   comparing an architecture of the developed application to an approved architecture to detect architectural changes and security risk associated with each detected architectural change.

7. The method of claim 1, wherein determining the compliance score further comprises:
   comparing a code and a configuration of the developed software application to a set of configuration standards and compliance security controls, wherein the configuration standards and compliance security controls are obtained from a third-party tool.

8. The method of claim 1, wherein determining the vulnerability score further comprises:
   receiving, from security monitoring tools, reports of vulnerabilities and incidents;
   determining a number of vulnerabilities and incidents out of the reported vulnerabilities and incidents that are related to the developed software application and the environment; and
   computing the vulnerability score as a function of the number of reported vulnerabilities and incidents.

9. The method of claim 1, wherein the security score is a weighted average of the architecture score, the compliance score, and the vulnerability score.

10. The method of claim 1, wherein the security score is determined during a software development lifecycle, and wherein the software development tool is a continuous integration and continuous delivery (CI/CD) tool.

11. The method of claim 1, wherein the architectural score is a function of a number of determined architectural changes in the generated architectural model with respect to the approved architecture.

12. A non-transitory computer readable medium having stored thereon instructions for causing a processing circuitry to execute a process for securing development of software applications to be deployed in a cloud computing platform, the process comprising:
   receiving at least one trigger from a software development tool, wherein the at least one trigger requests a security evaluation for a software application developed using the software development tool;

determining an architecture score, wherein the architecture score measures a degree to which the architecture of the developed software application, as represented by an architectural model generated for the software application to be executed by the cloud computing platform, matches an approved architecture for the software application;

determining a compliance score, wherein the compliance score measures the compliance of the developed software application to at least one predefined security policy;

determining a vulnerability score, wherein the vulnerability score measures a resiliency of the developed software application to at least one reported security vulnerability; and determining a security score based on the architecture score, the compliance score, and the vulnerability score, wherein the security score is a likelihood that the developed software application can be deployed in the cloud computing platform without harming an environment of an organization executing the developed software application.

13. A system for securing development of software applications to be deployed in a cloud computing platform, comprising:

a processing circuitry; and a memory, the memory containing instructions that, when executed by the processing circuitry, configure the system to:

receive at least one trigger from a software development tool, wherein the at least one trigger requests a security evaluation for a software application developed using the software development tool;

determine an architecture score, wherein the architecture score measures a degree to which the architecture of the developed software application, as represented by an architectural model generated for the software application to be executed by the cloud computing platform, matches an approved architecture for the software application;

determine a compliance score, wherein the compliance score measures the compliance of the developed software application to at least one predefined security policy;

determine a vulnerability score, wherein the vulnerability score measures a resiliency of the developed software application to at least one reported security vulnerability; and determine a security score based on the architecture score, the compliance score, and the vulnerability score, wherein the security score is a likelihood that the developed software application can be deployed in the cloud computing platform without harming an environment of an organization executing the developed software application.

14. The system of claim 13, wherein the system further configured to:

compare the determined security score to a predefined benchmark; and perform a mitigation action to block deployment of the developed software application in the environment when the result of the comparison is that the determined security score exceeds the predefined benchmark by a prescribed threshold.

15. The system of claim 14, wherein the system is further configured to:

report the determined security score to a security information and event management (SIEM) system.

16. The system of claim 13, wherein the system is further configured to:

monitor a trend over time of the security score.

17. The system of claim 13, wherein the at least one trigger is sent upon an existence of at least one of: a newly developed software application and changes in the developed software application.

18. The system of claim 13, wherein the system is further configured to:

compare an architecture of the developed application to an approved architecture to detect architectural changes and security risk associated with each detected architectural change.

19. The system of claim 13, wherein the system is further configured to:

compare a code and a configuration of the developed software application to a set of configuration standards and compliance security controls, wherein the configuration standards and compliance security controls are obtained from a third-party tool.

20. The system of claim 13, wherein the system is further configured to:

receive from security monitoring tools, reports of vulnerabilities and incidents;

determine a number of vulnerabilities and incidents out of the reported vulnerabilities and incidents that are related to the developed software application and the environment; and compute the vulnerability score as a function of the number of reported vulnerabilities and incidents.

21. The system of claim 13, wherein the security score is a weighted average of the architecture score, the compliance score, and the vulnerability score.

22. The system of claim 13, wherein the security score is determined during a software development lifecycle, and wherein the software development tool is a continuous integration and continuous delivery (CI/CD) tool.

23. The system of claim 13, wherein the architectural score is a function of a number of determined architectural changes in the generated architectural model with respect to the approved architecture.

* * * * *

UNITED STATES PATENT AND TRADEMARK OFFICE
CERTIFICATE OF CORRECTION

PATENT NO. : 12,141,291 B1
APPLICATION NO. : 17/338173
DATED : November 12, 2024
INVENTOR(S) : Assaf Rappaport et al.

It is certified that error appears in the above-identified patent and that said Letters Patent is hereby corrected as shown below:

In the Specification

Column 9, Line 58 should read:
At S560, the security score is reported and displayed. The score can be displayed with respect to its trend over time and in comparison, to a benchmark defined by the organization. In another embodiment, the security score may be reported to SIEM systems and the like to enrich event reports by such systems. As noted above, the security score may also be utilized to activate gating throughout the various stages of the development pipeline.

Signed and Sealed this
Eighth Day of April, 2025

Coke Morgan Stewart
*Acting Director of the United States Patent and Trademark Office*